United States Patent
Chaudhary et al.

(10) Patent No.: US 10,100,172 B2
(45) Date of Patent: Oct. 16, 2018

(54) PLASTICIZERS AND PLASTICIZED POLYMERIC COMPOSITIONS

(71) Applicant: Dow Global Technologies LLC, Midland, MI (US)

(72) Inventors: Bharat I. Chaudhary, Princeton, NJ (US); Jeffrey M. Cogen, Flemington, NJ (US); Paul D. Ries, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 314 days.

(21) Appl. No.: 14/396,777

(22) PCT Filed: May 7, 2013

(86) PCT No.: PCT/US2013/039841
§ 371 (c)(1),
(2) Date: Oct. 24, 2014

(87) PCT Pub. No.: WO2014/003892
PCT Pub. Date: Jan. 3, 2014

(65) Prior Publication Data
US 2015/0111036 A1   Apr. 23, 2015

Related U.S. Application Data

(60) Provisional application No. 61/664,193, filed on Jun. 26, 2012.

(51) Int. Cl.
| | |
|---|---|
| *C08K 5/1515* | (2006.01) |
| *C08K 5/11* | (2006.01) |
| *C08K 5/00* | (2006.01) |
| *H01B 3/44* | (2006.01) |
| *C08K 3/08* | (2006.01) |
| *H01B 7/29* | (2006.01) |

(52) U.S. Cl.
CPC .............. *C08K 5/1515* (2013.01); *C08K 3/08* (2013.01); *C08K 5/0016* (2013.01); *C08K 5/11* (2013.01); *H01B 3/443* (2013.01); *H01B 7/292* (2013.01); *C08K 2003/0893* (2013.01); *Y10T 428/2933* (2015.01)

(58) Field of Classification Search
CPC ...... C08K 5/0016; C08K 5/11; C08K 3/0041; C08K 3/08; C08K 5/001615; C08K 5/1515; C08K 5/15; C08L 27/06; C08L 27/00; C08F 14/06; H01B 7/292; H01B 3/44; H01B 3/443; Y10T 428/29; Y10T 428/2933
USPC ................... 428/375; 524/109, 114
See application file for complete search history.

(56) References Cited

U.S. PATENT DOCUMENTS

| | | |
|---|---|---|
| 2,397,592 A | 4/1946 | Blades |
| 2,403,215 A | 7/1946 | Foster |
| 2,458,484 A | 1/1949 | Terry et al. |
| 2,500,918 A | 3/1950 | Rueter et al. |
| 2,618,622 A | 11/1952 | Grummit et al. |
| 2,666,752 A | 1/1954 | Grummit et al. |
| 3,138,566 A | 6/1964 | Arnold |
| 3,381,837 A | 5/1968 | Testa et al. |
| 3,409,580 A | 11/1968 | Alzner |
| 3,451,958 A | 6/1969 | Riedeman et al. |
| 3,639,318 A | 2/1972 | Tijunelis et al. |
| 3,668,091 A | 6/1972 | French et al. |
| 3,712,875 A | 1/1973 | Tijunelis |
| 3,778,465 A | 12/1973 | Barnstorf |
| 3,780,140 A | 12/1973 | Hammer |
| 3,868,341 A | 2/1975 | Sauer et al. |
| 3,872,187 A | 3/1975 | Fath |
| 3,891,694 A | 6/1975 | Mills et al. |
| 4,083,816 A | 4/1978 | Frankel et al. |
| 4,346,145 A | 8/1982 | Choi et al. |
| 4,421,886 A | 12/1983 | Worschech et al. |
| 4,426,477 A | 1/1984 | Yasumatsu et al. |
| 4,556,694 A | 12/1985 | Wallace |
| 4,605,694 A | 8/1986 | Walker |
| 4,612,192 A | 9/1986 | Scheuffgen et al. |
| 4,613,533 A | 9/1986 | Loomis et al. |
| 4,627,993 A | 12/1986 | Loomis |
| 4,670,494 A | 6/1987 | Semenza, Jr. |
| 4,857,600 A | 8/1989 | Gross et al. |

(Continued)

FOREIGN PATENT DOCUMENTS

| | | |
|---|---|---|
| CA | 1188445 A1 | 6/1985 |
| CN | 1341681 A | 3/2002 |

(Continued)

OTHER PUBLICATIONS

Hanno C. E., Milan M., and David G. C., 'Designing green plasticizers: Influence of molecular geometry on biodegredation and plasticization properties'. Chemosphere (2012), 86(8), 759-766. CAPLUS [online]. [retrieved on Dec. 29, 2016]. Retrieved from: STN International, USA. Accession No. 2012:150552. DOI 10.1016/j.chemosphere.2011.10.054.*
Reinecke, H., Navarro, R. and Pérez, M. 2011. Plasticizers. Encyclopedia of Polymer Science and Technology. (p. 11) Retrieved from: Wiley Online Library [online]. [retrieved on Jan. 4, 2017]. DOI: 10.1002/0471440264.pst245.pub2.*
Weil, Edward D., Levchik, Sergei V., (2016) Flame Retardants for Plastics and Textiles—Practical Applications (2nd Edition)—4.1 Introduction. Hanser Publishers, pp. 89-90.*

(Continued)

*Primary Examiner* — Jennifer A Chriss
*Assistant Examiner* — Elizabeth M. Dahlburg
(74) *Attorney, Agent, or Firm* — Husch Blackwell LLP

(57) ABSTRACT

Plasticizers comprising a succinate ester and an epoxidized natural oil and plasticized polymeric compositions comprising such plasticizers. Such plasticized polymeric compositions can be employed in forming various articles of manufacture, such as coated conductors.

16 Claims, No Drawings

(56) References Cited

U.S. PATENT DOCUMENTS

| | | | |
|---|---|---|---|
| 5,180,889 A * | 1/1993 | Rogers | H01B 3/44 |
| | | | 174/110 SR |
| 5,225,108 A | 7/1993 | Bae et al. | |
| 5,227,417 A | 7/1993 | Kroushl, III | |
| 5,246,783 A | 9/1993 | Spenadel et al. | |
| 5,270,366 A | 12/1993 | Hein | |
| 5,278,236 A | 1/1994 | Case et al. | |
| 5,430,108 A | 7/1995 | Schlosberg et al. | |
| 5,454,806 A | 10/1995 | Shinonome | |
| 5,464,903 A | 11/1995 | Hofmann | |
| 5,466,267 A | 11/1995 | Baillargeon et al. | |
| 5,575,965 A | 11/1996 | Caronia et al. | |
| 5,736,605 A | 4/1998 | Oshima | |
| 5,756,570 A | 5/1998 | Hoch et al. | |
| 5,886,072 A | 3/1999 | Linsky et al. | |
| 6,063,846 A | 5/2000 | Weng et al. | |
| 6,114,425 A | 9/2000 | Day et al. | |
| 6,274,750 B1 | 8/2001 | Sato et al. | |
| 6,417,260 B1 | 7/2002 | Weng et al. | |
| 6,437,170 B1 | 8/2002 | Thil et al. | |
| 6,451,958 B1 | 9/2002 | Fan et al. | |
| 6,495,033 B1 | 12/2002 | Talboom | |
| 6,496,629 B2 | 12/2002 | Ma et al. | |
| 6,608,142 B1 | 8/2003 | Weng et al. | |
| 6,706,815 B2 | 3/2004 | Marchand et al. | |
| 6,714,707 B2 | 3/2004 | Rossi et al. | |
| 6,734,241 B1 | 5/2004 | Nielsen et al. | |
| 6,797,753 B2 | 9/2004 | Benecke et al. | |
| 6,849,694 B2 | 2/2005 | Hata | |
| 6,949,597 B2 | 9/2005 | Nielsen et al. | |
| 7,700,675 B2 | 4/2010 | Bueno de Almeida et al. | |
| 2002/0013396 A1 | 1/2002 | Benecke et al. | |
| 2004/0122159 A1 | 6/2004 | Mhetar et al. | |
| 2005/0090590 A1 | 4/2005 | Nielsen et al. | |
| 2005/0203230 A1 | 9/2005 | Kadakia et al. | |
| 2006/0025544 A1 | 2/2006 | Koube et al. | |
| 2006/0276575 A1 | 12/2006 | Hamaguchi et al. | |
| 2007/0100049 A1 | 5/2007 | Ishizuka | |
| 2007/0135562 A1 | 6/2007 | Freese et al. | |
| 2008/0200595 A1 | 8/2008 | Hinault et al. | |
| 2008/0227993 A1 | 9/2008 | Zuckerman | |
| 2009/0149585 A1 | 6/2009 | De Quadros Junior et al. | |
| 2009/0149586 A1 | 6/2009 | De Quadros Junior et al. | |
| 2009/0312478 A1 | 12/2009 | Hasegawa et al. | |
| 2010/0010127 A1 | 1/2010 | Barki et al. | |
| 2010/0256278 A1 | 10/2010 | Harada et al. | |
| 2011/0076502 A1 | 3/2011 | Chaudhary et al. | |
| 2011/0272174 A1 * | 11/2011 | Chaudhary | C08L 27/06 |
| | | | 174/110 SR |
| 2013/0005937 A1 | 1/2013 | Cramail et al. | |

FOREIGN PATENT DOCUMENTS

| | | |
|---|---|---|
| CN | 101070510 A | 11/2007 |
| CN | 101108982 A | 1/2008 |
| CN | 101591588 A | 12/2009 |
| CN | 101824193 A | 9/2010 |
| CN | 101914219 A | 12/2010 |
| EP | 0192961 A1 | 9/1986 |
| EP | 0358179 A2 | 3/1990 |
| EP | 0364717 A1 | 4/1990 |
| EP | 0 393 813 A1 | 10/1990 |
| EP | 0473915 A1 | 3/1992 |
| EP | 0565984 A1 | 10/1993 |
| EP | 0986606 A1 | 3/2000 |
| EP | 1218443 A1 | 7/2002 |
| EP | 1361039 A1 | 11/2003 |
| EP | 1624014 A1 | 2/2006 |
| EP | 2070977 A2 | 6/2009 |
| EP | 2245089 A1 | 11/2010 |
| FR | 1437722 A | 5/1966 |
| GB | 102292 A | 11/1916 |
| GB | 499931 A | 1/1939 |
| GB | 790314 A | 2/1958 |
| GB | 910543 A | 11/1962 |
| GB | 934689 A | 8/1963 |
| GB | 1102506 A | 2/1968 |
| GB | 1341623 A | 12/1973 |
| GB | 2155021 A | 9/1985 |
| JP | S44-007131 | 3/1969 |
| JP | S61-016950 | 1/1986 |
| JP | 04-059851 B2 | 2/1992 |
| JP | H04-085354 | 3/1992 |
| JP | H04-261452 A | 9/1992 |
| JP | 2003-064233 A | 3/2003 |
| JP | 2003-297149 A | 10/2003 |
| JP | 2004311064 A | 11/2004 |
| JP | 2010-042669 A | 2/2010 |
| WO | 1997030115 A1 | 8/1997 |
| WO | 0114466 A1 | 3/2001 |
| WO | 2001098404 A2 | 12/2001 |
| WO | 2004052977 A1 | 6/2004 |
| WO | 2007006489 A1 | 1/2007 |
| WO | 2008081330 A1 | 7/2008 |
| WO | 2008081332 A1 | 7/2008 |
| WO | 2008122364 A1 | 10/2008 |
| WO | 2009102877 A1 | 8/2009 |
| WO | 2011/041380 A1 | 4/2011 |
| WO | 2011/041388 A1 | 4/2011 |
| WO | 2011041372 A1 | 4/2011 |
| WO | 2012130545 A1 | 10/2012 |
| WO | 2013003225 A2 | 1/2013 |

OTHER PUBLICATIONS

Rothon, Roger N., (2003) Particulate-Filled Polymer Composites (2nd Edition)—2. Principal Types of Particulate Fillers. Smithers Rapra Technology, p. 95.*

PCT/US2013/039841, International Search Report and Written Opinion, dated Mar. 27, 2014.

PCT/US2013/039841, International Preliminary Report on Patentability, dated Dec. 21, 2014.

PCT/IN2012/00688, International Search Report and Written Opinion, dated Jun. 18, 2013.

PCT/IN2012/00688, International Preliminary Report on Patentability, dated Apr. 30, 2015.

PCT/IN2012/000746 International Search Report and Written Opinion, dated May 31, 2013.

PCT/IN2012/000746, International Preliminary Report on Patentability, dated May 12, 2015.

PCT/US2013/039840 International Search Report and Written Opinion, dated Jul. 11, 2013.

PCT/US2013/039840, International Preliminary Report on Patentability, dated Dec. 31, 2014.

PCT/US2014/020556 International Search Report and Written Opinion, dated Jun. 25, 2014.

PCT/US2010/050654, International Preliminary Report on Patentability, dated Mar. 31, 2012.

PCT/US2010/050676, International Preliminary Report on Patentability, dated Mar. 31, 2012.

PCT/US2011/045653, International Preliminary Report on Patentability, dated Jan. 28, 2013.

PCT/US2012/043740, International Preliminary Report on Patentability, dated Jan. 7, 2014.

PCT/US2012/055070, International Preliminary Report on Patentability, dated Apr. 1, 2014.

PCT/US2010/050669, International Preliminary Report on Patentability, dated Apr. 11, 2012.

PCT/US2011/035143, International Preliminary Report on Patentability, dated Nov. 10, 2012.

Erythropel H. C. et al; "Designing green plasticizers: Influence of molecular geometry on biodegradation and plasticization properties", Chemosphere, Pergamon Press, Oxford, GB, vol. 86, No. 8, Nov. 21, 2011, pp. 759-766.

Kastner J. et al; Aqueous leaching of di-2-ethylhexyl phthalate and green plasticizers from poly(vinyl chloride), Science of the Total Enviornment, Elsevier, Amsterdam, NL, vol. 432, Jun. 5, 2012, pp. 357-364.

(56) References Cited

OTHER PUBLICATIONS alibaba.com, Hebei Jingu Plasticizer Co., Ltd., 2012, http://hebjingu.en.alibaba.com.
Wikipedia, Chlorine, Jun. 15, 2012, http://en.wikipedia.org/wiki/Chlorine.
Wikipedia, Bleaching of Wood Pulp, May 8, 2012, http://en.wikipedia.org/wiki/Bleaching_of_wood_pulp.
Barnicoat, C.R. 1945. Reactions and properties of annatto as a cheese colour. Part II. J. Dairy Res. 14: 59-63.
Campanella A. et al.; High Yield Epoxidation of Fatty Acid Methyl Esters with Performic Acid Generated In Situ; Chemical Engineering Journal, 144 (2008) 466-475 (Elsevier B.V.).
Chuanshang Cai, et al.; Studies on the Kinetics of In Situ Epoxidation of Vegetable Oils; Eur. J. Lipid Sci. Technol., 2008, 110, 341-346 (Wiley-VCH GmbH & Co. KGaA, Weinheim).
Corrigan, Brian Oil purification, filtration and reclamation, Iron Age (1947) 159(14).
Danisco, Grindsted Soft-n-Safe brochure (date unknown), Jul. 2009.
Du G., et al., Catalytic Epoxidation of Methyl Linoleate, JAOCS, vol. 81, No. 4 (2004).
Freedman, F., Butterfield, R., and Pryde, E.H. Transesterification Kinetics of Soybean Oil. JAOCS, 63(10) p. 1375 (1986).
Gan, L. H., et al (1994) Epozidized esters of palm olein as plasticizers for poly (vinyl chloride). European Polymer Journal, 31(8), 719-724.
Greenspan, F. P. et al (1953) Epoxy fatty acid ester plasticizers. Indstrial and Engineering Chemistry, 445(12), 2722-2726.
Greenspan, F.P. et al (1956), Epoxy fatty acid ester plasticizers. Preparartion and properties, The Journal of the American Oil Chemists Society, 33, 391-394.
Grummitt O. and Fleming H. Acetylated Castor Oil Industrial and Engineering Chemistry, vol. 37, No. 5, May 1945, pp. 485-491.
Haas, Michael J. Improving the Economics of biodiesel production through the use of low value lipids as feedstocks: vegetable oil soapstock, Fuel Processing Technology 86 p. 1087-96 (2005).
Jensen, R.G. Purification of Triglycerides with an Aluminca Column, Lipids, 451-452 (1966).
Morgenstern, B. "Epoxidized Fatty Acid Esters as Plasticizers for PVC" dated Apr. 22, 2005.
Morgenstern, B. Epoxidized Fatty Acid Esters as Plasticizers for PVC, presented at the 7th Freiberg Polymer Conference, Apr. 21 and 22, 2005.
Morgenstern, B. Use of Modified Fatty Acid Esters as Plasticizers for PVC, dated Sep. 12, 2003.
Opposition to patent EP2245089, Dated Jan. 9, 2013.
Orellana-Coca et al., Lipase Mediated Simultaneious Esterification and Epoxidation of Oleic Acid for the Production of Alkylepoxystearates. Journal of Molecular Catalysis B: Enzymatic 44 (2007) 133-137.
Stuart, A et al., Polym. Bull. (2010) 65:589-598.
Rehberg, C. et. Al. Plasticizers from Lactic Esters and Biabasic Acids Ind. Eng. Chem., 1952, 44 (9), pp. 2191-2195.
Santacesaria E. et al.; A Biphasic Model Describing Soybean Oil Epoxidation with H2O2 in a Fed-Batch Reactor; Chemical Engineering Journal, vol. 173, Issue 1, Sep. 1, 2011, pp. 198-209 (Elsevier B.V.).
Senžana S. et al.; Kinetics of In Situ Epoxidation of Soybean Oil in Bulk Catalyzed by Ion Exchange Resin; Journal of the American Oil Chemists' Society, vol. 78, No. 7 (2001) 725-731 (AOCS Press).
Sheehan, J et al. "A Look Back at the U.S. Department of Energy's Aquatic Species Program: Biodiesel from Algae", National Renewable Energy Laboratory, Colorado, Jul. 1998, pp. 1-294.
Taylor, D. R. Proceedings of the World Conference on oilseed technology and utilization, Adsorptive Purification, American Oil Chemists Society, Champaing, 1992, p. 152-165.
Tekin A., and Hammond E. Factors Affecting the Electrical Resistivity of Soybean Oil, JAOCS, vol. 75(6) 1998.
XP002657062 Vertellus Performance Materials Inc.; Flexricin P-8 Technical Data Sheet, Nov. 2006.
XP002669860, Thomson Scientific, Mar. 13, 2009, London, GB.
TCI America, Online Catalog: retrieved Jun. 13, 2013 Tributyrin; http://web.archive.org/web/20080511154307/http://www.tciamerica.com/, retrieved Jun. 13, 2013.
PCT/ US2009/033935, International Preliminary Report on Patentability, dated Aug. 26, 2010.
PCT/US2009/033935 International Search Report and Written Opinion, dated May 18, 2009.
PCT/US2010/050654 International Search Report and Written Opinion dated Nov. 9, 2010.
PCT/US2010/050676 International Search Report and Written Opinion dated Jan. 12, 2011.
PCT/US2010/050690 International Preliminary Report on Patentability, dated Jan. 12, 2012
PCT/US2010/050690 International Search Report and Written Opinion, dated Aug. 2, 2011.
PCT/US2010/050699 International Search Report and Written Opinion, dated Nov. 8, 2010.
PCT/US2011/035143 International Search Report and Written Opinion, dated Aug. 26, 2011.
PCT/US2011/041557 International Preliminary Report on Patentability, dated Aug. 31, 2012.
PCT/US2011/041557 International Search Report and Written Opinion dated Sep. 5, 2011.
PCT/US2011/045653 International Search Report and Written Opinion, dated Oct. 7, 2011.
PCT/US2012/043740 International Search Report and Written Opinion, dated Jan. 23, 2013.
PCT/US2012/055070 International Search Report and Written Opinion, dated Dec. 3, 2012.
PCT/US2013/023362 International Search Report and Written Opinion, dated Mar. 28, 2013.
PCT/US2013/023362, International Preliminary Report on Patentability, dated Aug. 12, 2014.
PCT/US2011/059166 International Search Report and Written Opinion, dated Feb. 29 2012.
PCT/US2011/059166, International Preliminary Report on Patentability, dated May 7, 2013.
PCT/IN2012/000745 International Search Report and Written Opinion, dated Aug. 29, 2013.
PCT/IN2012/000745, International Preliminary Report on Patentability, dated May 12, 2015.

* cited by examiner

sionall Application No. 61/664,193 filed on Jun. 26, 2012.

PLASTICIZERS AND PLASTICIZED POLYMERIC COMPOSITIONS

REFERENCE TO RELATED APPLICATIONS

The present application claims the benefit of U.S. Provisional Application No. 61/664,193 filed on Jun. 26, 2012.

FIELD

Various embodiments of the present invention relate to plasticizers and plasticized polymeric compositions.

INTRODUCTION

Plasticizers are compounds or mixtures of compounds that are added to polymer resins that can lower the modulus and tensile strength, and increase flexibility, elongation, impact strength, and tear strength of the resin (typically a thermoplastic polymer) to which they are added. A plasticizer may also lower the glass transition temperature of the polymer resin, which enhances processability of the polymer resin.

Phthalic acid diesters (also known as "phthalates") are commonly used as plasticizers in many flexible polymer products, such as polymer products formed from polyvinyl chloride ("PVC") and other vinyl polymers. Examples of phthalate plasticizers include diisononyl phthalate, diallyl phthalate, di-2-ethylhexyl-phthalate, dioctyl phthalate, and diisodecyl phthalate.

Phthalate plasticizers have recently come under intense scrutiny by public interest groups concerned about the negative environmental impact of phthalates and potential adverse health effects in humans exposed to phthalates. Accordingly, suitable replacements for phthalate plasticizers are desired.

SUMMARY

One embodiment is a plasticized polymeric vinyl chloride composition, comprising:
(a) a vinyl chloride resin; and
(b) a plasticizer, comprising:
  (i) a succinate ester, and
  (ii) an epoxidized natural oil,
wherein said plasticized polymeric vinyl chloride composition has a Shore D hardness of less than 30, as determined by ASTM D2240 when said plasticizer is present in an amount of 52 parts per hundred resin based on 100 parts by weight of the vinyl chloride resin,
wherein said plasticized vinyl chloride polymer composition has a tensile elongation retention of at least 30% when aged at 100° C. for 168 hours, as determined by ASTM D638.

DETAILED DESCRIPTION

Various embodiments of the present invention concern plasticizers comprising a succinate ester and an epoxidized natural oil. These plasticizers may optionally also include an epoxidized fatty acid alkyl ester. Such plasticizers can be incorporated with a polymeric resin to form plasticized polymeric compositions, which can in turn be employed in various articles of manufacture.

Plasticizer

The present disclosure provides a plasticizer comprising a succinate ester and an epoxidized natural oil. In an embodiment, the plasticizer is phthalate-free, or is otherwise void or substantially void of phthalate.

The succinate ester component of the plasticizer can be any known or hereafter discovered succinate ester. In an embodiment, the succinate ester is a dialkyl succinate ester, where each alkyl group is independently selected from the group consisting of saturated or unsaturated, branched, straight-chain, or cyclic $C_1$ to $C_{13}$ (i.e., having from 1 to 13 carbon atoms) alkyl groups. As used herein the term "alkyl" denotes a univalent group formed by removing a hydrogen atom from a hydrocarbon. In various embodiments, the succinate ester can be a mixture of dialkyl succinate esters, in which at least 25 mole percent ("mol %"), at least 50 mol %, at least 75 mol %, substantially all, or all of the alkyl groups have from 8 to 13 carbon atoms. Alkyl groups of this embodiment can be saturated, and can be branched or straight-chain. Non-limiting examples of suitable dialkyl succinate esters include bis(2-ethylhexyl) succinate, dioctyl succinate, dinonyl succinate, diisononyl succinate, didecyl succinate, diisodecyl succinate, diundecyl succinate, diisoundecyl succinate, didodecyl succinate, diisododecyl succinate, ditridecyl succinate, diisotridecyl succinate, or combinations of two or more thereof. In one or more embodiments, the succinate ester is bis(2-ethylhexyl) succinate. Succinate esters (e.g., bis(2-ethylhexyl) succinate) are commercially available from Myriant Technologies, LLC.

The present plasticizer also includes an epoxidized natural oil ("eNO"). A "natural oil," as used herein, is an oil composed of fatty acid triglycerides and derived from a microbe (algae, bacteria), a plant/vegetable, and/or a seed. In an embodiment, natural oils include genetically-modified natural oils. In various embodiments, the natural oil excludes petroleum-derived oil. Non-limiting examples of suitable natural oils include beef tallow oil, canola oil, castor oil, corn oil, fish oil, linseed oil, palm oil, rapeseed oil, safflower oil, soybean oil, sunflower oil, tall oil, tung oil, and any combination thereof.

The term "epoxidized natural oil," as used herein, is a natural oil wherein at least one fatty acid moiety contains at least one epoxide group. Epoxidation may be performed via conventional methods, typically by way of reaction of the natural oil with a peroxide, a percarboxylic acid, and/or other peroxy compounds, often in the presence of an acid or base catalyst.

Non-limiting examples of suitable eNO include epoxidized algae oil, epoxidized beef tallow oil, epoxidized canola oil, epoxidized castor oil, epoxidized corn oil, epoxidized fish oil, epoxidized linseed oil, epoxidized palm oil, epoxidized rapeseed oil, epoxidized safflower oil, epoxidized soybean oil, epoxidized sunflower oil, epoxidized tall oil, epoxidized tung oil, and any combination thereof.

In an embodiment, the epoxidized natural oil is an epoxidized soybean oil ("eSO").

Examples of suitable commercially available epoxidized natural oils include PLAS-CHEK™ 775 epoxidized soybean oil, available from Ferro Corp., Mayfield Heights, Ohio, USA; VIKOFLEX™ 7170 epoxidized soybean oil, and VIKOFLEX™ 7190 epoxidized linseed oil, both available from Arkema Inc., Philadelphia, Pa., USA.

In an embodiment, the plasticizer contains the succinate ester in an amount ranging from 10 to 50 weight percent ("wt %"), or from 30 to 50 wt %, based on the entire plasticizer weight. In a further embodiment, the plasticizer contains the eNO in an amount ranging from 50 to 90 wt %, or from 50 to 70 wt %, based on the entire plasticizer weight. Thus, in various embodiments, the succinate ester and the eNO can be present in a weight ratio ranging from 9:1 to 1:1, or from 7:3 to 1:1, eNO-to-succinate ester. In one or more embodiments, the plasticizer consists of or consists essentially of succinate ester and eNO.

As noted above, the plasticizer can optionally further contain an epoxidized fatty acid alkyl ester ("eFAAE"), such as epoxidized fatty acid methyl ester. Non-limiting examples of commercially available eFAAEs include VIKOFLEX™ 7010, VIKOFLEX™ 7040, VIKOFLEX™ 7080, VIKOFLEX™ 9010, VIKOFLEX™ 9040, and VIKOFLEX™ 9080 (products of Arkema Inc., Philadelphia, Pa., USA). When such a three-component plasticizer is employed, the eFAAE can be present in amounts ranging from greater than 0 up to 30 wt %, based on the total plasticizer weight, while maintaining the eNO-to-succinate ester ratios described above.

Polymeric Composition

The present disclosure provides a polymeric composition comprising a polymeric resin and the above-described plasticizer.

Non-limiting examples of suitable polymeric resins include polysulfides, polyurethanes, acrylics, epichlorohydrins, nitrile rubber, chlorosulfonated polyethylene, chlorinated polyethylene, polychloroprene, styrene butadiene rubber, natural rubber, synthetic rubber, ethylene-propylene-diene monomer rubber, propylene-based polymers, ethylene-based polymers, and vinyl chloride resins. The term "propylene-based polymer" denotes a polymer comprising a majority weight percent polymerized propylene monomer (based on the total amount of polymerizable monomers) and optionally at least one polymerized comonomer. The term "ethylene-based polymer" denotes a polymer comprising a majority weight percent polymerized ethylene monomer (based on the total weight of polymerizable monomers) and optionally at least one polymerized comonomer.

The term "vinyl chloride resin" denotes a vinyl chloride polymer, such as polyvinyl chloride ("PVC"), or a vinyl chloride copolymer, such as vinyl chloride/vinyl acetate copolymer, vinyl chloride/vinylidene chloride copolymer, vinyl chloride/ethylene copolymer, or a copolymer prepared by grafting vinyl chloride onto ethylene/vinyl acetate copolymer. The vinyl chloride resin can also include a polymer blend of the above-mentioned vinyl chloride polymer or vinyl chloride copolymer with other miscible or compatible polymers including, but not limited to, chlorinated polyethylene, thermoplastic polyurethane, olefin polymers such as a methacryl polymer, or acrylonitrile-butadiene-styrene polymer.

In an embodiment, the vinyl chloride resin is PVC.

In an embodiment, the polymeric composition comprises the polymeric resin in an amount ranging from 20 to 90 wt %, from 30 to 85 wt %, from 40 to 80 wt %, or from 52 to 61 wt %, based on the entire polymeric composition weight. In various embodiments, the polymeric composition comprises the above-described plasticizer in an amount ranging from 10 to 80 wt %, from 15 to 70 wt %, from 20 to 60 wt %, or from 30 to 44 wt %, based on the entire polymeric composition weight.

In various embodiments, the polymeric composition has a Shore D hardness of less than 30, less than 29, or less than 28, as determined by ASTM D2240. In such embodiments, the polymeric composition can have a minimum Shore D hardness of 25. In other embodiments, the polymeric composition has a Shore A hardness of less than 95, less than 90, less than 86 or less than 85, as determined by ASTM D2240. In such embodiments, the polymeric composition can have a minimum Shore A hardness of 82. Shore hardness (both A and D) is determined on polymeric compositions having a plasticizer loading of 52 parts per hundred resin ("phr") based on 100 parts by weight of the polymeric resin.

In various embodiments, the polymeric composition has a tensile elongation retention ("TER") of at least 30, at least 40, at least 50, at least 60, or at least 70% after heat aging at 100° C., 113° C., and/or 136° C. for 168 hours or 240 hours, as determined by ASTM D638. Heat-aging of polymeric compositions is performed according to the procedure described below in the following Test Methods section. TER can be determined on polymeric compositions having a plasticizer loading of 52 phr.

In various embodiments, the polymeric composition has a tensile strength retention ("TSR") of at least 100, at least 110, at least 115, at least 120, or at least 125% after heat aging at 100° C., 113° C., and/or 136° C. for 168 hours or 240 hours, as determined by ASTM D638. TSR can be determined on polymeric compositions having a plasticizer loading of 52 phr.

In various embodiments, the polymeric composition has a weight retention of at least 75, at least 80, at least 85, or at least 90% after heat aging at 100° C., 113° C., and/or 136° C. for 168 hours or 240 hours. Weight retention can be determined on polymeric compositions having a plasticizer loading of 52 phr.

Additives

The polymeric composition may include one or more of the following optional additives: a filler, a flame retardant, a heat stabilizer, an anti-drip agent, a colorant, a lubricant, a low molecular weight polyethylene, a hindered amine light stabilizer, a UV light absorber, a curing agent, a booster, a retardant, a processing aid, a coupling agent, an antistatic agent, a nucleating agent, a slip agent, a viscosity control agent, a tackifier, an anti-blocking agent, a surfactant, an extender oil, an acid scavenger, a metal deactivator, and any combination thereof.

In an embodiment, the polymeric composition comprises a heat stabilizer. Non-limiting examples of suitable heat stabilizers include lead-free metal soaps, lead stabilizers, organic heat stabilizers, epoxides, salts of monocarboxylic acids, phenolic antioxidants, organic phosphites, and/or betadiketones. In an embodiment, the heat stabilizer employed is a lead-free mixed metal soap. The term "metal soap" denotes a salt of an acid with a metal. Metal soaps suitable for use include zinc salts of fatty acids (e.g., zinc stearate), calcium salts of fatty acids, barium salts of fatty acids, magnesium salts of fatty acids, tin salts of fatty acids, and mixtures of two or more thereof. Heat stabilizers can be present in the polymeric composition in an amount ranging from 0.2 to 10 wt %, from 0.4 to 7 wt %, or from 0.6 to 5 wt %, based on the entire polymeric composition weight.

In an embodiment, the polymeric composition includes PVC, the present plasticizer, a filler (e.g., calcium carbonate, clays, silica, and any combination thereof), one or more metal soap stabilizers, a phenolic or other antioxidant, and a processing aid.

Coated Conductor

The present disclosure provides a coated conductor. The coated conductor includes a conductor and a coating on the conductor, the coating at least partially being formed from the polymeric composition described above.

A "conductor," as used herein, is one or more wire(s) or fiber(s) for conducting heat, light, and/or electricity. The conductor may be a single-wire/fiber or a multi-wire/fiber and may be in strand form or in tubular form. "Wire" means a single strand of conductive metal or a single strand of optical fiber. Non-limiting examples of suitable conductors include metals such as silver, gold, copper, carbon, and aluminum. The conductor may also be optical fiber made from either glass or plastic.

The coated conductor may be flexible, semi-rigid, or rigid. The coating (also referred to as a "jacket," "sheath," or "insulation") can be located either directly on the conductor or on another layer that surrounds the conductor.

In an embodiment, the coated conductor is a cable. "Cable" and "power cable" mean at least one wire or optical fiber within a sheath. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783, 6,496,629 and 6,714,707.

In an embodiment, the cable is a 60° C., 75° C., 80° C., 90° C., or 105° C.-rated cable according to Underwriters Laboratories ("UL") standards 83 and 1581.

TEST METHODS

Shore Hardness

Determine Shore (A and D) hardness according to ASTM D2240 using molded specimens of 250 mil (6.35 mm) thickness.

Tensile Properties

Determine tensile strength, tensile elongation, and secant modulus for both unaged and heat-aged samples according to ASTM D638 at a displacement rate of 2 inches per minute on Type IV dog bone-shaped specimens that are cut from 30-mil (0.762 mm) thick molded plaques.

Volume Resistivity

Determine volume resistivity (ohm·cm at 23° C.) with 500 volts direct current in accordance with ASTM D257. Employ 3.5-inch (8.89 cm) diameter specimens cut from 40-mil (1.016 mm) thick molded plaques and a Hewlett Packard 16008A Resistivity Cell connected to a Hewlett Packard 4329A High Resistance Meter.

Dynamic Storage Modulus (G')

Determine dynamic storage modulus by dynamic mechanical analysis using a TA Instrument AR1000N Rheometer in torsion mode on a specimen in the form of a rectangular solid of 40 mm length and 13 mm width that is cut from a molded plaque of 40 mil (1.016 mm) thickness. Vary the temperature from −100° C. to 160° C. at a ramp rate of 5° C./min, holding the test frequency constant at 6.283 rad/s (1 Hz). Measure the storage modulus, loss modulus, and tan delta as a function of temperature.

Loop Spew (Plasticizer Compatibility)

Measure loop spew in accordance with ASTM D3291.

Weight Retention

Measure weight retained, expressed as a percentage, after various days at elevated temperatures on specimens of 1.25 inch (3.715 cm) diameter that are cut from 30-mil (0.762 mm) thick molded plaques.

Heat Aging

Heat aging for tensile and weight retention specimens (of geometries described above) is conducted using a Type II ASTM D5423-93 Testing Mechanical Convection Oven.

EXAMPLES

Example 1 and Comparative Examples 1-4

In the following examples, the PVC employed is OXYVI-NYLS™ 240F (Occidental Chemical Corporation, Dallas, Tex., USA), the filler is SATINTONE™ SP-33 Clay (BASF Corporation, Florham Park, N.J., USA), the heat stabilizer is a calcium/zinc metal soap sold under the name BAERO-PAN™ MC 90249 KA (Baerlocher USA, Dover, Ohio, USA), and the antioxidant is IRGANOX™ 1076 (BASF SE, Ludwigshafen, Del.). The plasticizers employed are as follows: dioctyl phthalate ("DOP") (obtained from Acros Organics, NJ, USA), diisodecyl phthalate ("DIDP") (obtained from Univar, Redmond, Wash., USA), trioctyl trimellitate ("TOTM") (obtained from Sigma-Aldrich, St. Louis, Mo., USA), bis(2-ethylhexyl) succinate (also known as dioctyl succinate, "DOS") (obtained from Myriant Technologies LLC, Woburn, Mass., USA), and a mixture of 50 wt % DOS and 50 wt % epoxidized soybean oil ("eSO") (PLAS-CHEK™ 775, obtained from Ferro Corp., Mayfield Heights, Ohio, USA) based on the entire plasticizer weight. Mixtures of plasticizers are prepared by simply combining and shaking the two plasticizer components for a time (e.g., 5 minutes). Prepare plasticized PVC samples according to the formulations provided in Table 1, below.

TABLE 1

| Ex. 1, Comp. Ex. 1-4 Sample Compositions | | | | | |
|---|---|---|---|---|---|
|  | Ex. 1 | CE. 1 | CE. 2 | CE. 3 | CE. 4 |
| PVC (wt %) | 60.3 | 60.3 | 60.3 | 60.3 | 60.3 |
| Filler (wt %) | 6.4 | 6.4 | 6.4 | 6.4 | 6.4 |
| Heat Stabilizer (wt %) | 3.0 | 3.0 | 3.0 | 3.0 | 3.0 |
| Antioxidant (wt %) | 0.3 | 0.3 | 0.3 | 0.3 | 0.3 |
| 50:50 eSO:DOS (wt %) | 30.0 | — | — | — | — |
| DOP (wt %) | — | 30.0 | — | — | — |
| DIDP (wt %) | — | — | 30.0 | — | — |
| TOTM (wt %) | — | — | — | 30.0 | — |
| DOS (wt %) | — | — | — | — | 30.0 |
| Total | 100 | 100 | 100 | 100 | 100 |
| Plasticizer parts per hundred resin ("phr") | ~50 | ~50 | ~50 | ~50 | ~50 |

Prepare the above samples by preheating the plasticizer (or plasticizer mixture) to 60° C. for at least 60 minutes and shake by hand for a few seconds before use. After weighing the individual components, prepare "dry blends" by soaking the plasticizer composition into the PVC powder, and then prepare melt mixtures. Prepare "dry blends" as follows:

(a) Mix all ingredients except plasticizer and filler in a container using spatula.

(b) Warm up a 40 cm³ Brabender mixing bowl with sigma blades at 90° C. and 40 rpm for two minutes.

(c) Add the mixed ingredients from step (a) to the mixing bowl and mix for 30 seconds.

(d) Add the plasticizer to the mixing bowl and mix for 6 minutes, and record time for complete plasticizer absorption, as determined by visual observation.

(e) Add filler and mix for 60 seconds.

(f) Stop and remove the dry blend.

Thereafter, melt mix the "dry blends" using the Brabender mixing bowl with cam rotors at 40 rpm setting and mixing at 180° C. for 5 minutes.

Compression mold the resulting blend compositions at 180° C. for 5 minutes (2 minutes at approximately 500 psi, followed by 3 minutes at approximately 2,000 psi). Employing the procedures described above, measure the properties of (1) unaged specimens, and (2) specimens aged at elevated temperatures. The heat-aged specimens are also examined visually for evidence of exudate (spew) at the surface. Measure properties of the samples according to the procedures outlined above. The results are provided in Table 2, below.

TABLE 2

Properties of Ex. 1 and Comp. Ex. 1-4

|  | Ex. 1 (eSO/DOS) | CE. 1 (DOP) | CE. 2 (DIDP) | CE. 3 (TOTM) | CE. 4 (DOS) |
|---|---|---|---|---|---|
| Plasticizer absorption time | 1 min. | 2 min. | 3 min. | 4 min. | 2 min. |
| Shore D Hardness | 27.2 ± 0.6 | 29.7 ± 0.4 | 33.7 ± 0.6 | 36.8 ± 0.3 | 24.5 ± 0.2 |
| Shore A Hardness | 83.6 ± 0.9 | 82.8 ± 0.8 | 85.5 ± 0.8 | 88.2 ± 1.4 | 80.9 ± 0.5 |
| TS, unaged (psi) | 2989 ± 128 | 3059 ± 212 | 2701 ± 445 | 3348 ± 135 | 2819 ± 52 |
| TSR after 100° C. aging (%) | 121 ± 11 | 103 ± 12 | 122 ± 14 | 82 ± 14 | 192 ± 13 |
| TSR after 113° C. aging (%) | 126 ± 10 | 193 ± 13 | 103 ± 32 | 98 ± 6 | 218 ± 9 |
| TE, unaged (%) | 287 ± 27 | 254 ± 22 | 237 ± 53 | 278 ± 14 | 320 ± 7 |
| TER after 100° C. aging (%) | 75 ± 19 | 50 ± 14 | 119 ± 14 | 78 ± 19 | 4 ± 1 |
| TER after 113° C. aging (%) | 79 ± 8 | 1 ± 0 | 67 ± 53 | 101 ± 2 | 1 ± 0 |
| WR after 113° C. aging (%) | 85.5 | 76.7 | 91.7 | 98.9 | 72.6 |
| G' at −20° C. (Pa) | 1.26E+09 | 1.07E+09 | 0.99E+09 | 1.52E+09 | 0.41E+09 |
| Surface Exudate, 113° C. aging | None | None | None | None | None |
| Loop spew, 48 hrs at 23° C. | Very slight | None | None | Slight | Slight |
| VR at 23° C. (Ohms cm) | 1.89E+09 | 1.83E+09 | 1.47E+09 | 7.67E+09 | 1.51E+09 |

TS = Tensile strength, ASTM D638
TSR = Tensile strength retention, ASTM D638
TSR 100° C. = Tensile strength retention, (%), specimen aged at 100° C. for 240 hours
TSR 113° C. = Tensile strength retention, (%), specimen aged at 113° C. for 168 hours
TE = Tensile elongation, ASTM D638
TER = Tensile elongation retention, ASTM D638
TER 100° C. = Tensile elongation retention (%), specimen aged at 100° C. for 240 hours
TER 113° C. = Tensile elongation retention (%), specimen aged at 113° C. for 168 hours
VR = Volume Resistivity (ohms·cm)
WR = Weight Retained, specimen aged at 113° C. for 168 hours Several conclusions can be drawn from the results shown in Table 2 regarding the eSO and DOS blend plasticizer (Example 1): (a) exhibits rapid plasticizer uptake (as evidenced by short plasticizer absorption time); (b) higher plasticization efficiency (as evidenced by lower Shore D hardness than three of the four comparative samples); (c) provides excellent properties before and after heat aging (at temperatures of 100° C. and 113° C.); (d) shows little or no exudation after being subject to the loop-spew test or aging at elevated temperatures; (e) is sufficiently flexible at a temperature of −20° C.; and (f) exhibits satisfactory volume resistivity.

Example 2 and Comparative Examples 5-7

The components employed in these examples are the same as described above in Example 1, except that no filler is employed, and the heat stabilizer is BAEROPAN™ MC 9754 KA (Baerlocher USA, Dover, Ohio, USA). Note that the plasticizer employed in Comparative Example 6 is 100 wt % eSO. Prepare plasticized PVC samples according to the formulations provided in Table 3, below.

TABLE 3

Ex. 2, Comp. Ex. 5-7 Sample Compositions

|  | Ex. 2 | CE. 5 | CE. 6 | CE. 7 |
|---|---|---|---|---|
| PVC (wt %) | 52.7 | 52.7 | 52.7 | 52.7 |
| Heat Stabilizer (wt %) | 3.0 | 3.0 | 3.0 | 3.0 |
| Antioxidant (wt %) | 0.3 | 0.3 | 0.3 | 0.3 |
| 50:50 eSO:DOS (wt %) | 44.0 | — | — | — |
| DOP (wt %) | — | 44.0 | — | — |
| eSO (wt %) | — | — | 44.0 | — |
| DOS (wt %) | — | — | — | 44.0 |
| Total | 100 | 100 | 100 | 100 |
| Plasticizer phr | ~83 | ~83 | ~83 | ~83 |

Prepare samples in the same manner as Example 1, with the following exceptions: (1) mix plasticizer in step (d) for 10 minutes instead of 6; and (2) melt mix the dry blends for 10 minutes instead of 5. Compression mold and analyze the samples as in Example 1. The results are provided in Table 4, below.

TABLE 4

Properties of Ex. 2 and Comp. Ex. 5-7

|  | Ex. 2 (eSO/DOS) | CE. 5 (DOP) | CE. 2 (eSO) | CE. 4 (DOS) |
|---|---|---|---|---|
| Shore D Hardness | 14.6 ± 0.2 | 14.6 ± 0.4 | 16.7 ± 0.2 | 13.0 ± 0.3 |
| Shore A Hardness | 65.7 ± 0.4 | 66.4 ± 1.1 | 68.2 ± 0.4 | 64.1 ± 0.7 |
| TS, unaged (psi) | 1925 ± 67 | 1921 ± 40 | 2160 ± 235 | 1740 ± 93 |
| TSR after 100° C. aging (%) | 174 ± 19 | 130 ± 47 | 109 ± 16 | 249 ± 66 |
| TE, unaged (%) | 360 ± 76 | 357 ± 27 | 330 ± 23 | 389 ± 28 |
| TER after 100° C. aging (%) | 91 ± 27 | 50 ± 5 | 118 ± 5 | 4 ± 3 |
| WR after 100° C. aging (%) | 78.4 | 81.2 | 100.0 | 59.4 |
| Surface Exudate, 100° C. aging | None | None | None | None |
| Loop spew, 48 hrs at 23° C. | None | Very Slight | None | Slight |

TS = Tensile strength, ASTM D638
TSR 100° C. = Tensile strength retention, (%), specimen aged at 100° C. for 240 hours
TE = Tensile elongation, ASTM D638
TER 100° C. = Tensile elongation retention (%), specimen aged at 100° C. for 240 hours
WR = Weight Retained, specimen aged at 100° C. for 240 hours Several conclusions can be drawn from the results shown in Table 4 regarding the eSO and DOS blend plasticizer (Example 2): (a) higher plasticization efficiency than eSO alone (as evidenced by lower Shore hardness); (b) provides excellent properties before and after heat aging (at a temperature of 100° C.); and (c) shows no exudation after being subject to the loop-spew test or aging at elevated temperatures.

Examples 3-5 and Comparative Examples 8-11

In the following examples, the plasticizer employed in Example 3 is the 50:50 (wt/wt) eSO/DOS plasticizer described above. In Example 4, a plasticizer containing 70 wt % eSO and 30 wt % DOS is employed, based on the entire plasticizer weight. In Example 5, the plasticizer contains 90 wt % eSO and 10 wt % DOS, based on the entire plasticizer weight. In Comparative Example 8, the plasticizer is 100 wt % DOS. Comparative Example 9 employs a plasticizer having 10 wt % eSO and 90 wt % DOS, based on the entire plasticizer weight. In Comparative Example 10, the plasticizer comprises 30 wt % eSO and 70 wt % DOS, based on the entire plasticizer weight. Comparative Example 11 employs a plasticizer that is 100 wt % eSO. Other components are the same as described in Example 1, above, with the addition of a flame retardant, MICROFINE™ AO9 antimony trioxide (available from Chemtura Corp., Middlebury, Conn., USA). Prepare plasticized PVC samples according to the formulations provided in Table 5, below.

TABLE 5

Ex. 3-5, Comp. Ex. 8-11 Sample Compositions

|  | Ex. 3 | Ex. 4 | Ex. 5 | CE. 8 | CE. 9 | CE. 10 | CE. 11 |
|---|---|---|---|---|---|---|---|
| PVC (wt %) | 57.3 | 57.3 | 57.3 | 57.3 | 57.3 | 57.3 | 57.3 |
| Filler (wt %) | 6.4 | 6.4 | 6.4 | 6.4 | 6.4 | 6.4 | 6.4 |
| Heat Stabilizer (wt %) | 3.0 | 3.0 | 3.0 | 3.0 | 3.0 | 3.0 | 3.0 |
| Flame Retardant (wt %) | 3.0 | 3.0 | 3.0 | 3.0 | 3.0 | 3.0 | 3.0 |
| Antioxidant (wt %) | 0.3 | 0.3 | 0.3 | 0.3 | 0.3 | 0.3 | 0.3 |
| 50:50 eSO:DOS (wt %) | 30.0 | — | — | — | — | — | — |
| 70:30 eSO:DOS (wt %) | — | 30.0 | — | — | — | — | — |
| 90:10 eSO:DOS (wt %) | — | — | 30.0 | — | — | — | — |
| DOS (wt %) | — | — | — | 30.0 | — | — | — |
| 10:90 eSO:DOS (wt %) | — | — | — | — | 30.0 | — | — |
| 30:70 eSO:DOS (wt %) | — | — | — | — | — | 30.0 | — |
| eSO (wt %) | — | — | — | — | — | — | 30.0 |
| Total | 100 | 100 | 100 | 100 | 100 | 100 | 100 |
| Plasticizer phr | ~52 | ~52 | ~52 | ~52 | ~52 | ~52 | ~52 |

Prepare samples in the same manner as Example 1, with the following exceptions: (1) mix plasticizer in step (d) for 10 minutes instead of 6; and (2) melt mix the dry blends for 10 minutes instead of 5. Compression mold and analyze the samples as in Example 1. The results are provided in Table 6, below.

TABLE 6

Properties of Ex. 3-5 and Comp. Ex. 8-11

|  | Ex. 3 | Ex. 4 | Ex. 5 | CE. 8 | CE. 9 | CE. 10 | CE. 11 |
|---|---|---|---|---|---|---|---|
| Shore D Hardness | 26.9 ± 0.3 | 28.4 ± 0.5 | 32.2 ± 0.5 | 25.5 ± 0.7 | 25.5 ± 0.6 | 27.3 ± 0.6 | 33.0 ± 0.5 |
| Shore A Hardness | 84.0 ± 0.6 | 84.7 ± 0.9 | 87.7 ± 0.7 | 82.9 ± 1.0 | 83.9 ± 1.3 | 84.9 ± 0.8 | 88.0 ± 1.0 |
| TS, unaged (psi) | 2904 ± 252 | 2928 ± 212 | 3232 ± 46 | 2566 ± 260 | 2609 ± 214 | 2899 ± 126 | 3455 ± 32 |

TABLE 6-continued

Properties of Ex. 3-5 and Comp. Ex. 8-11

|  | Ex. 3 | Ex. 4 | Ex. 5 | CE. 8 | CE. 9 | CE. 10 | CE. 11 |
|---|---|---|---|---|---|---|---|
| TSR after 100° C. aging (%) | 147 ± 19 | 122 ± 9 | 100 ± 4 | 219 ± 29 | 195 ± 17 | 198 ± 16 | 108 ± 0 |
| TSR after 113° C. aging (%) | 135 ± 6 | 124 ± 13 | 106 ± 0 | 270 ± 49 | 200 ± 46 | 193 ± 31 | 102 ± 8 |
| TSR after 136° C. aging (%) | 141 ± 19 | 129 ± 7 | 98 ± 18 | 258 ± 29 | 227 ± 24 | 219 ± 7 | 96 ± 4 |
| TE, unaged (%) | 337 ± 47 | 332 ± 11 | 321 ± 22 | 306 ± 36 | 314 ± 31 | 317 ± 16 | 316 ± 10 |
| TER after 100° C. aging (%) | 87 ± 31 | 88 ± 9 | 112 ± 10 | 1 ± 0 | 1 ± 0 | 1 ± 1 | 102 ± 7 |
| TER after 113° C. aging (%) | 77 ± 11 | 96 ± 6 | 111 ± 12 | 1 ± 0 | 1 ± 0 | 2 ± 1 | 102 ± 25 |
| TER after 136° C. aging (%) | 74 ± 22 | 95 ± 11 | 68 ± 17 | 2 ± 1 | 1 ± 0 | 2 ± 1 | 77 ± 3 |
| WR after 7 days at 100° C. aging (%) | 84.9 | 90.8 | 96.7 | 73.8 | 75.3 | 79.2 | 99.9 |
| WR after 7 days at 113° C. aging (%) | 84.9 | 90.7 | 96.6 | 72.0 | 74.0 | 78.9 | 99.8 |
| WR after 7 days at 136° C. aging (%) | 84.6 | 90.5 | 96.2 | 70.2 | 73.0 | 78.5 | 99.5 |
| G' at −20° C. (Pa) | 4.13E+08 | 6.19E+08 | 9.37E+08 | 1.85E+08 | 2.23E+08 | 4.30E+08 | 1.08E+09 |
| Surface Exudate, 7 days at 100 to 136° C. aging | None | None | None | None | None | None | None |
| Loop spew, 48 hrs at 23° C. | Slight | Slight | Slight | None | None | Slight | Slight |
| VR at 23° C. (Ohms cm) | 1.18E+15 | 1.76E+15 | 3.90E+15 | 1.42E+15 | 1.40E+15 | 8.48E+14 | 4.51E+15 |

TS = Tensile strength, ASTM D638
TSR = Tensile strength retention, ASTM D638
TSR 100° C. = Tensile strength retention, (%), specimen aged at 100° C. for 168 hours
TSR 113° C. = Tensile strength retention, (%), specimen aged at 113° C. for 168 hours
TSR 136° C. = Tensile strength retention, (%), specimen aged at 136° C. for 168 hours
TE = Tensile elongation, ASTM D638
TER = Tensile elongation retention, ASTM D638
TER 100° C. = Tensile elongation retention (%), specimen aged at 100° C. for 168 hours
TER 113° C. = Tensile elongation retention (%), specimen aged at 113° C. for 168 hours
TER 136° C. = Tensile elongation retention (%), specimen aged at 136° C. for 168 hours
VR = Volume Resistivity (Ohms cm)
WR = Weight Retained, specimen aged for 168 hours Several conclusions can be drawn from the results shown in Table 6 regarding the eSO and DOS blended plasticizers having at least 50 wt % eSO (Examples 3-5): (a) higher plasticization efficiency (as evidenced by lower Shore hardness compared to the 100% eSO plasticizer, CE 11); (b) provides excellent properties before and after heat aging (at temperatures of 100, 113, and 136° C.) particularly with regard to tension elongation retention as compared to plasticizers having high or 100% DOS content, CE 8-10; (c) shows little or no exudation after being subject to the loop-spew test or aging at elevated temperatures; (d) is sufficiently flexible at a temperature of −20° C.; and (e) exhibits satisfactory volume resistivity.

The invention claimed is:

1. A plasticized polymeric vinyl chloride composition consisting of:
   (a) a vinyl chloride resin;
   (b) a plasticizer consisting of:
      (i) from 30 to 50 weight percent of a succinate ester, based on the entire weight of the plasticizer, and
      (ii) from 50 to 70 weight percent of an epoxidized natural oil, based on the entire weight of the plasticizer; and
   (c) optionally, an additive selected from the group consisting of a metal soap, a lead stabilizer, an epoxide, a salt of monocarboxylic acid, an organic phosphite, a betadiketone, calcium carbonate, clay, silica, antimony trioxide, an antioxidant, and combinations thereof,
   wherein said plasticized polymeric vinyl chloride composition has a Shore D hardness of less than 30, as determined by ASTM D2240 when said plasticizer is present in an amount of 52 parts per hundred resin based on 100 parts by weight of the vinyl chloride resin,
   wherein said plasticized vinyl chloride polymer composition has a tensile elongation retention of at least 30% when aged at 100° C. for 168 hours, as determined by ASTM D638.

2. The composition of claim 1, wherein said succinate ester is a dialkyl succinate ester, wherein each alkyl group is independently selected from the group consisting of saturated or unsaturated, branched, straight-chain, or cyclic $C_1$ to $C_{13}$ alkyl groups.

3. The composition of claim 1, wherein said succinate ester is bis(2-ethylhexyl) succinate.

4. The composition of claim 1, wherein said plasticizer is present in an amount ranging from 20 to 60 weight percent, based on the entire weight of said plasticized polymeric vinyl chloride composition, wherein said vinyl chloride resin is present in an amount ranging from 40 to 80 weight percent, based on the entire weight of said plasticized polymeric vinyl chloride composition.

5. The composition of claim 1, wherein said epoxidized natural oil is epoxidized soybean oil.

6. The composition of claim 1 comprising the metal soap, wherein the metal soap is present in an amount ranging from 0.6 to 5 weight percent based on the entire weight of said plasticized polymeric vinyl chloride composition.

7. The composition of claim 6 further comprising the clay.

8. The composition of claim 7 comprising the antimony trioxide.

9. A coated conductor comprising a conductive core and a polymeric layer surrounding at least a portion of said conductive core, wherein said plasticized polymeric vinyl chloride composition of claim 1 constitutes said polymeric layer.

10. The composition of claim 1, wherein the plasticized vinyl chloride polymer composition has a weight retention of at least 75% when aged at 113° C. for 168 hours when the plasticizer is present in an amount of 52 parts per hundred resin based on 100 parts by weight of the vinyl chloride resin.

11. The composition of claim 1, wherein the plasticizer consists of:
    (i) from 30 to 50 weight percent bis(2-ethylhexyl) succinate, based on the entire weight of the plasticizer, and
    (ii) from 50 to 70 weight percent epoxidized soybean oil, based on the entire weight of the plasticizer.

12. The composition of claim 11, wherein the composition consists of:
    (a) from 40 wt % to 80 wt % of the vinyl chloride resin;
    (b) from 20 wt % to 60 wt % of the plasticizer; and
    (c) from 0.4 wt % to 7 wt % of the metal soap, based on the entire weight of the polymeric composition.

13. The composition of claim 1 wherein the plasticized polymeric vinyl chloride composition has a Shore D hardness from 25 to less than 29, as determined by ASTM D2240 when said plasticizer is present in an amount of 52 parts per hundred resin based on 100 parts by weight of the vinyl chloride resin.

14. The composition of claim 13 comprising the antimony trioxide, the clay, and the antioxidant, and
    the plasticized vinyl chloride polymer composition has a tensile elongation retention of at least 70% when aged at 100° C. for 168 hours, as determined by ASTM D638; and a weight retention of at least 80% when aged at 113° C. for 168 hours when the plasticizer is present in an amount of 52 parts per hundred resin based on 100 parts by weight of the vinyl chloride resin.

15. The composition of claim 1 wherein the plasticized polymeric vinyl chloride composition has a Shore A hardness from 82 to less than 95, as determined by ASTM D2240 when said plasticizer is present in an amount of 52 parts per hundred resin based on 100 parts by weight of the vinyl chloride resin.

16. The composition of claim 1, wherein the plasticized vinyl chloride polymer composition has a tensile strength retention of at least 100% when aged at 113° C. for 168 hours when the plasticizer is present in an amount of 52 parts per hundred resin based on 100 parts by weight of the vinyl chloride resin.

* * * * *